May 24, 1955 B. BAIM 2,708,768
CATTLE SLAUGHTERING APPARATUS
Filed Oct. 8, 1952 2 Sheets-Sheet 1
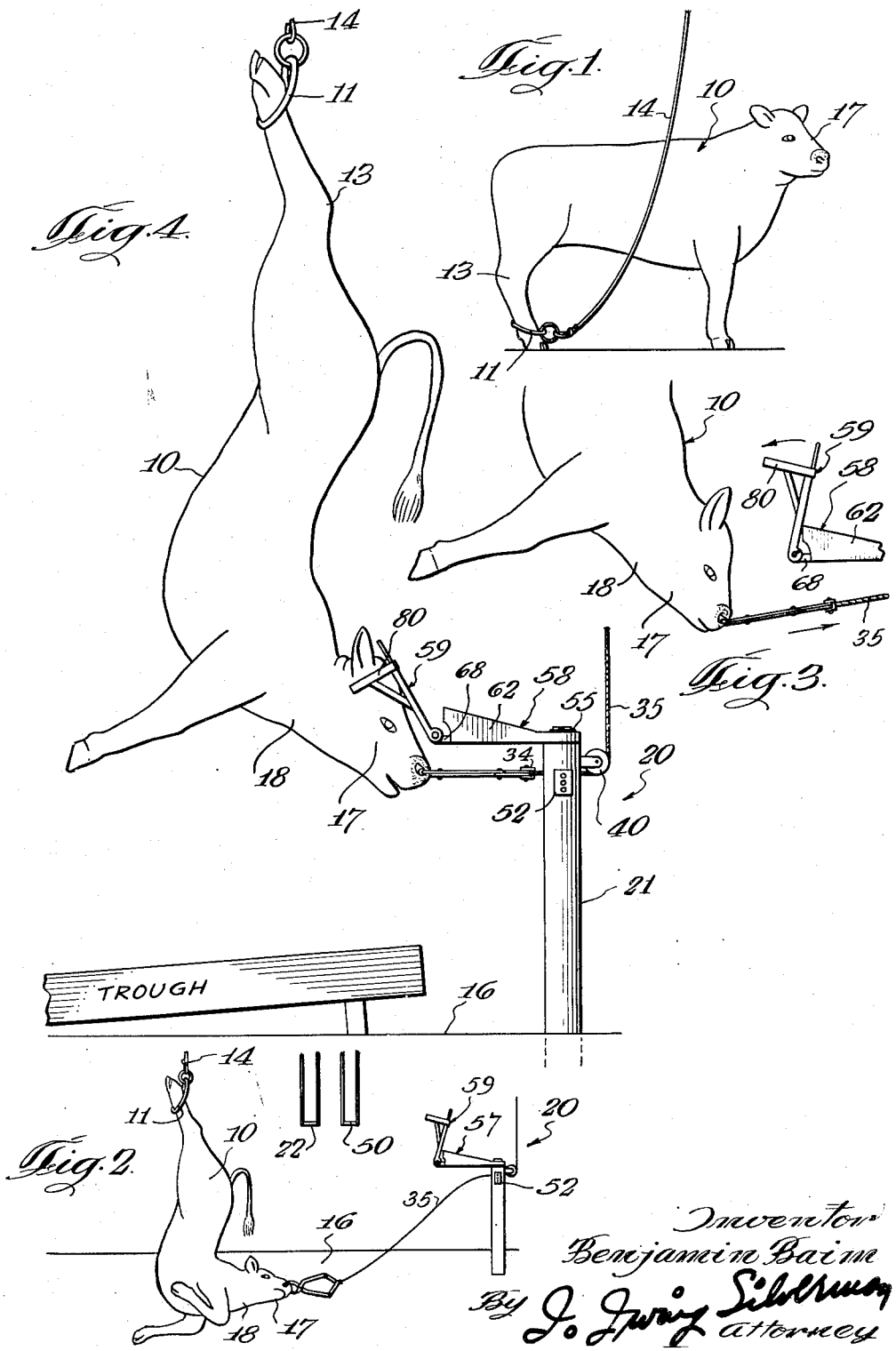
Inventor
Benjamin Baim
By J. Irving Silverman
Attorney May 24, 1955 B. BAIM 2,708,768
CATTLE SLAUGHTERING APPARATUS
Filed Oct. 8, 1952 2 Sheets-Sheet 2
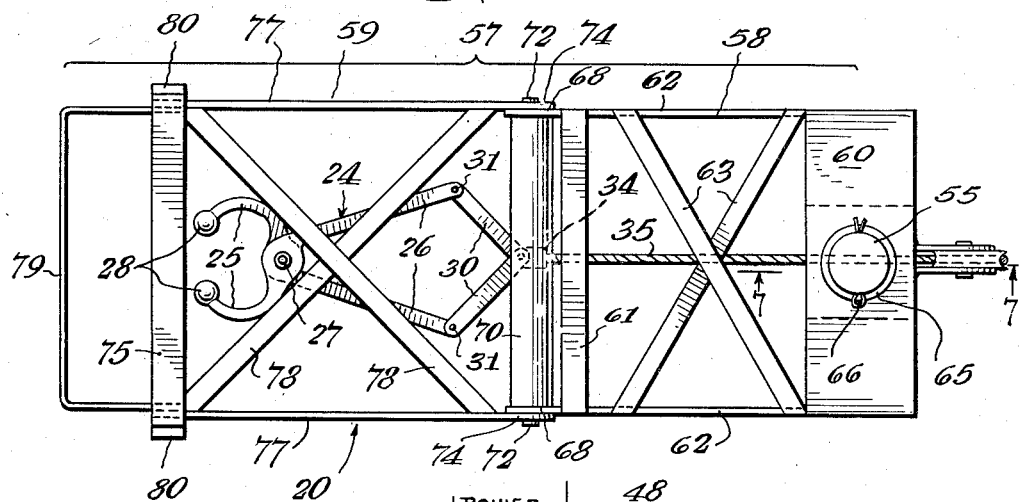
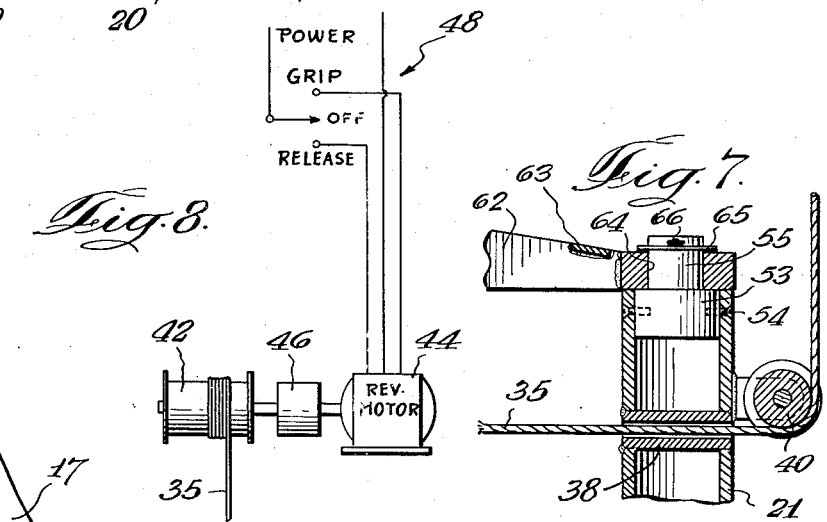
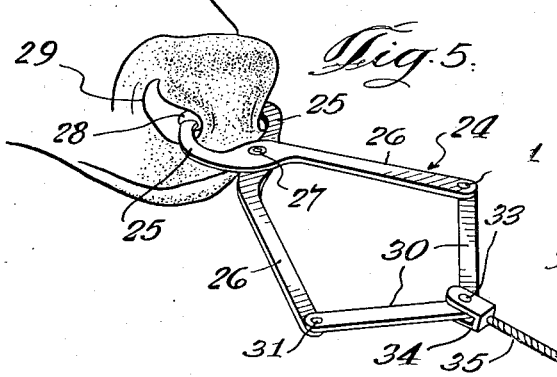

United States Patent Office 2,708,768
Patented May 24, 1955

2,708,768

CATTLE SLAUGHTERING APPARATUS

Benjamin Baim, Chicago, Ill.

Application October 8, 1952, Serial No. 313,709

2 Claims. (Cl. 17—1)

This invention relates generally to cattle slaughtering apparatus and more particularly is related to a specific apparatus useful in slaughtering animals which are not previously stunned.

In the slaughtering of domestic animals in abattoirs, particularly in large stockyards, where considerable quantities of animals are handled, it is usual to stun the animal prior to its being slaughtered by striking same over the head with a mallet or the like, after which the quiescent animal is hoisted into the air and completely off the slaughtering floor. In this position, the slaughtering operation can be done quickly, without danger to the workmen, and the greatest portion of the blood can be caught for utilization in the preparation of various medicinal and other preparations.

It is required, however, in many instances that the animals be slaughtered without their previously being stunned. Thus, where the animals are to be slaughtered in accordance with the Mosaic law, it is necessary that the animal be fully conscious so that immediately the jugular vein and esophagus have been severed, the reaction of the animal will forcefully expel the blood and hasten a more humane demise. The principal difficulties which have arisen in connection with this method have to do with the thrashing of the animal prior to its being slaughtered. It is necessary to have workmen hold the animal in proper position, exposing said workmen to the kicking and flailing of the animal's legs. Furthermore, the workmen and the butcher as well are likely to be injured in the movements of the animal while the knife is being drawn across its throat. The flailing and movements of the animal also prevent uniform incisions being made with the attendant disadvantage of hides being damaged.

In order to alleviate some of the difficulty of this type of slaughtering, the animals are only partially hoisted off the slaughtering floor so that the head and neck rest on the floor. In this manner, the workman assisting the butcher is enabled to press against the head of the animal in any manner he can to hold the same during the cutting operation. The workman is usually provided with a metal cradle or holder which he engages over the animal's head to enable him to twist the head to expose the neck to the butcher's knife. This permits the butcher to make an incision in a sort of vertical movement, as best he can. The animal being on the abattoir floor, the blood is not capable of being caught in a sanitary manner and hence is lost for medicinal and other purposes requiring at least some degree of cleanliness. Likewise, there is some danger of the carcass becoming contaminated. Health authorities have disapproved methods of slaughtering in which any part of the animal is upon the floor during the process.

It is therefore a principal object of my invention to provide apparatus for the slaughtering of animals in a humane and speedy method which will alleviate all of the difficulties set forth above, but which will permit the slaughtering to take place while the animal is fully conscious, in accordance with the Mosaic law.

Still another object of the invention is to provide apparatus by means of which cattle or other domestic animals may be slaughtered while completely off the ground or floor, but without any danger to the workmen.

Another object of the invention is to provide apparatus which will enable slaughtering of the type herein described to proceed at a greater rate, and with less likelihood of damaging the hides of the animals.

Other objects of the invention lie in the provision of a column to which the animal is secured in a novel manner through the use of a nostril clamping device; the provision of a novel system whereby the workman need only insert the clamping device in the nostrils of the animal and cause the operation of means to draw the clamping device to the column; the provision of a novel swivelled holding device operating in conjunction with the column and the clamping device to prevent lateral movement of the animal's head; the provision of a simple and economical device for accomplishing the advantages set forth above.

Many other objects will occur to those skilled in the art as the description of the invention proceeds. In connection with the description I have illustrated a preferred embodiment of the invention from which the invention, its manner of construction, operation and use should immediately be apparent.

In the drawings in which like or similar characters of reference designate the same or similar parts throughout the several figures of the drawings:

Fig. 1 is a view of an animal such as a cow or steer immediately prior to slaughtering, there being a shackle secured to one or both of the hind legs, connected to a cable or chain for hoisting the hind quarter of the animal off the floor.

Fig. 2 is a perspective view of the abattoir floor showing my apparatus in use. The animal has had its hind quarters hoisted into the air, and the nostril clamping device has been secured to the animal preparatory to the animal being drawn to the column.

Fig. 3 is a side elevational view showing the manner in which the flexible connecting cable or chain secured to the nostril clamping device is being drawn toward the column.

Fig. 4 is a side elevational view but showing the animal in place ready to be slaughtered.

Fig. 5 is a perspective enlarged view of the nostril clamping device in use.

Fig. 6 is a top plan view of the apparatus of the invention.

Fig. 7 is a sectional view taken through the column along the line 7—7 of Fig. 6 and in the direction indicated.

Fig. 8 is a schematic diagram of the mechanism for operating the apparatus, which is shown merely by way of example and not limitation.

As previously set forth, the invention has as an important purpose the slaughtering of cattle in accordance with the Mosaic law, that is to say, while the animal is fully conscious, but in a more expeditious and less dangerous manner than heretofore used. Generally, it can be said that the invention comprises means for supporting the head of the animal being slaughtered so that the remainder of the animal may be hoisted off the abattoir floor. The head supporting means makes it a simple matter for a workman to render the animal's head immobile thereby permitting the butchering to occur quickly and precisely.

Referring now to the drawings, the reference character 10 is used generally to designate an animal being slaughtered. This may be a cow, calf, sheep, steer or the like, but the problems with which I am concerned arise principally in the case of cattle which are heavy and stronger than sheep and smaller animals. In normal slaughtering of this type, the animal is led into a pen or enclosure, which is not here illustrated, and a shackle or other securing device 11 is attached to one or both of the hind legs 13. The shackle 11 is attached to an overhead cable or chain 14 and as the animal is caused to come onto the slaughtering floor 16 its hind quarters are hoisted into the air as shown in Fig. 2, so that its head 17 and neck 18 are engaged against the floor 16, somewhat as shown in Fig. 2.

Up to this point the procedure is as heretofore practiced, but at this point, the assistant to the butcher was required to seize the animal's head and twist it so that the butcher has access to the neck.

I provide apparatus, designated generally 20 for enabling the animal to be held for speedy and humane slaughtering while totally suspended. I provide a hollow post or column 21 of steel or other rigid material, firmly anchored to the abattoir floor 16. It is preferably located in the vicinity of the switch handle 22 for operating the hoist (not shown) used to suspend the animals. I provide a nostril clamping device 24 best illustrated in Figs. 5 and 6 which is associated with the post or column 21 as will be described. The clamping device 24 is of generally pincer formation and comprises a pair of jaw portions 25 integrally formed on the ends of the levers 26 which are pivoted at 27. The operating ends of the jaws have spherical knobs 28 of a size suitable for insertion into the nostrils 29 of the animal 10 in the manner shown in Figs. 2 to 5 inclusive. Obviously considerable force can be applied by bringing the lever portions 26 together. This force is and of itself, however, is not sufficient to handle the animals, since clamping devices of the general calibre described thus far have been used but with little success for the solution of the problem at hand.

I provide a second pair of levers 30 pivotally secured at 31 to the respective lever portions 26 and together pivoted at 33 to a fitting 34 secured to the end of a chain or cable 35. This arrangement of levers 26 and 30 is a toggle system such that there is considerable amplification of the force which may be applied to the fitting 34 by pulling the cable 35. This is manifest as a pinching of the nostrils of the animal.

Through the use of some means at the control of the butcher's helper, the cable 35 may quickly be drawn up after the nostrils 29 are seized by the knobs 28, and the head of the animal 10 lifted off the floor as shown in Fig. 3. Simultaneously the hoist may be operated to enable the cable 14 to raise the animal a bit more. The head of the animal is thus held in position for the butcher to draw his knife precisely under the neck 18 of the animal in easy action. Since the head is off the floor 16 it is convenient to have a trough 36 nearby to catch the clean blood. Likewise since the workman need not hold the animal, his safety and that of the butcher are not endangered.

The cable 35 may be taken up in any of many different ways. For example, it may be passed through an anti-friction bushing 38 in the column 21, over a sheave 40 secured to the column to an overhead drum 42 operated by a reversible electric motor 44 through a slip clutch 46. A three position switch 48 may be used to operate the motor 44 at will, and the switch lever may be of the conventional hanging type, positioned alongside the hoist operating switch handle 22 as at 50 in Fig. 2. If desired switch buttons may be provided at 52 on the column 21. The slip clutch 46 may be eliminated in place of limit switches if desired. Likewise, the mechanism may include power driving apparatus below the floor 16 with the cable or chain 35 passing through the center of the post and to the mechanism below the floor.

It should be seen that while the head 17 of the animal is being held against forward and backward movement, and the weight of the animal is being supported by the cables 14 and 35, nevertheless there may well be lateral play to the animal's head 17, caused by the shaking of the animal's head. In order to prevent lateral movement of the head 17 of the animal, means are provided for holding the head while the clamping device 24 is being used. The top of the column 21 is provided with a block 53 secured in any suitable manner, such as for example, screws 54. This block has an upstanding stub shaft or swivel pin 55. Upon this pin 55 is secured my holding means, designated generally 57, which extends at right angles to the column 21.

The holding means 57 is formed of two parts, one of which is designated 58 and is adapted to pivot in a horizontal plane only, about the shaft or pin 55. The other part 59 which is to engage the animal's head, is swingably secured to the end of the part 57. In Figs. 2 and 3 part 59 is shown poised ready for use, and in Fig. 4 it is shown engaged upon the animal's head.

The part 58 has a generally rectangular formation, provided by a relatively sturdy rear cross bar 60, a front cross bar 61, side members 62, and cross-bracing 63. The part 58 may be fabricated from sheet or bar steel, and welded. Cross bar 60 is provided with a suitable opening 64 fitting pin 55, and is rotatively secured thereto by the ring 65 and cotter pin 66 or any other suitable pivotal connection. A pair of ears 68 are formed on ends of side members 62, and between the ears is disposed a roller 70 having its ends 72 journalled, not only in said ears 68 but also in ears 74 of the front part 59.

The front part 59 is of generally rectangular construction, including the front cross bar 75, side bars 77, bracing 78, and a U-shaped handle 79 secured to the front bar 75. At its side edges, the part 59 is provided with right angle cheek bars 80 suitably braced, to form with the cross bars and side bars 77 a sort of cradle to engage the animal's head, as illustrated in Fig. 4.

It will be seen that the animal is first partially disabled through the hoisting of its hind quarters into the air, then, by means of the nostril clamping device 24 and cable 35 lifted completely from the floor and secured to the column 21. The holding means 57 is now swivelled to the proper angle relative to the animal's head and the part 59 pivoted downward upon the head with cheek bars 80 engaging the side of the head. Under these conditions, the neck and head of the animal are rendered immobile as in Fig. 4, and the butcher readily and quickly passes the knife under the throat. Thereafter the switch handle 50 is operated to reverse motor 44, and drum 42 so that tension on cable 35 is released. The clamping device 24 is easily removed and the carcass pushed aside.

Through this apparatus, slaughtering of the type described has been rendered safe, speedy and uniform. The animal is slaughtered completely off the floor; the hide is cut as little as possible; the blood may be caught; the operation is easy to perform.

It is believed that the invention and the manner in which same may be utilized will be fully understood from the above without further description. Although a preferred embodiment has been illustrated, many variations in shape and size and minor details are possible without departing from the spirit or scope of the invention as defined in the attached claims.

What it is desired to claim by Letters Patent of the United States is:

1. In a slaughtering device of the character described, and adapted to be used in slaughtering domestic animals whose hind quarters have been elevated above the head of the animal from the abattoir floor which comprises a column adapted to be anchored in a vertical position to said floor spaced from the head of the animal, a flexible tension member passing through and guided by said column at a point thereon spaced above the floor, a nostril clamping device secured to one end of said member and controlled take-up means coupled to the opposite end thereof, said member capable of being slackened to permit the clamping device to be clamped to the nostrils prior to said hind quarters being elevated, said means being capable thereafter of pulling said clamping device in a direction tending to raise the same from the floor and into engagement with the column whereupon to raise the head of the animal exposing the neck thereof, and means on said column for holding the animal's head immobile once it has been drawn adjacent the column comprising an inverted cradle-like member pivoted on a horizontal axis and movable to engage over the head of the animal.

2. In a slaughtering device of the character described, and adapted to be used in slaughtering domestic animals whose hind quarters have been elevated above the head of the animal from the abattoir floor which comprises a column adapted to be anchored in a vertical position to said floor spaced from the head of the animal, a flexible tension member passing through and guided by said column at a point thereon spaced above the floor, a nostril clamping device secured to one end of said member and controlled take-up means coupled to the opposite end thereof, said member capable of being slackened to permit the clamping device to be clamped to the nostrils prior to said hind quarters being elevated, said means being capable thereafter of pulling said clamping device in a direction tending to raise the same from the floor and into engagement with the column whereupon to raise the head of the animal exposing the neck thereof, and means on said column for holding the animal's head immobile once it has been drawn adjacent the column comprising a holding device adapted to engage over the head of the animal to hold same immobile, a horizontally arranged member pivoted to the column to swing in a horizontal plane, and said holding device being pivotally secured to the horizontally arranged member to swing on a horizontal axis.

References Cited in the file of this patent

UNITED STATES PATENTS

| | | |
|---|---|---|
| 89,922 | Fasig | May 11, 1869 |
| 291,357 | Kennedy | Jan. 1, 1884 |
| 337,358 | Allinson | Mar. 9, 1886 |
| 688,164 | Franke | Dec. 3, 1901 |
| 1,659,701 | Pocha | Feb. 21, 1928 |
| 1,935,138 | Windisch | Nov. 14, 1933 |
| 2,232,291 | Thompson | Feb. 18, 1941 |

FOREIGN PATENTS

| | | |
|---|---|---|
| 2,619 | Great Britain | June 29, 1878 |
| 14,348 | Great Britain | 1915 |
| 648,327 | Great Britain | Jan. 3, 1951 |